United States Patent [19]
Bisbee

[11] 3,850,504
[45] Nov. 26, 1974

[54] TELESCOPE WITH INFLATABLE DOOR
[75] Inventor: John Bisbee, Carlisle, Mass.
[73] Assignee: Itek Corporation, Lexington, Mass.
[22] Filed: Dec. 20, 1972
[21] Appl. No.: 316,776

[52] U.S. Cl. ................................. 350/65, 350/55
[51] Int. Cl. ......................................... G02b 23/16
[58] Field of Search .................. 350/65, 55; 138/93

[56] References Cited
UNITED STATES PATENTS
2,202,321  5/1940  Schuldt ............................... 138/93
2,857,933  10/1958  Lithun ................................. 138/93
FOREIGN PATENTS OR APPLICATIONS
930,578  7/1963  Great Britain ...................... 350/65

Primary Examiner—David H. Rubin
Attorney, Agent, or Firm—Homer O. Blair; Robert L. Nathans; William C. Roch

[57] ABSTRACT

An inflatable door for an orbiting, large space telescope. The door is inflated to seal the entrance aperture to the telescope at selected times. The inflatable door and all auxilliary equipment to operate the door are positioned adjacent to the secondary mirror in the telescope so that the primary mirror is not obscured by the system.

3 Claims, 3 Drawing Figures

CASSEGRAIN TELESCOPE

PATENTED NOV 26 1974    3,850,504

TELESCOPE WITH INFLATABLE DOOR

BACKGROUND OF THE INVENTION

The present invention relates generally to a door for sealing an aperture, and more particularly pertains to a new and improved inflatable door for an orbiting, large space telesscope wherein the door in its inflated condition seals the entrance aperture to the telescope.

With an orbiting, large space telescope, it will be necessary for space shuttle or other vehicles to visit the orbiting telescope periodically. The space shuttle on each visit will bring with it a cloud of waste gases including acidic and other corrosive gases which could possibly degrade the sensitive and high precision optics in the telescope. Also, there is a possibility that the telescope might at certain times be pointed directly at the sun, the intense radiation from which might damage some of the optical components of the telescope. Therefore, a door should be provided to seal the telescope entrance aperture at selected times. Traditional mechanical doors would present many problems when considering the unique requirements of an orbiting telescope. It would be desirable to have a door for sealing the entrance aperture to a large space telescope which is fast reacting, airtight, reliable, light weight, able to withstand the extreme environments of outer space, and which may be easily fitted to the telescope without interfering with the primary optical operation of the telescope.

SUMMARY OF THE INVENTION

In accordance with a preferred embodiment, an inflatable door is provided to selectively seal an aperture in a housing. Further, the preferred embodiment provides such a system wherein the housing encloses an optical system. Also the preferred embodiment provides such a system wherein the optical system is a Cassegrain telescope, and wherein the inflatable door is mounted adjacent to the secondary mirror of the telescope, whereby the door in its deflated position does not further obscure the primary mirror of the telescope. More particularly, the preferred embodiment provides such a system wherein the telescope is an orbiting telescope, and wherein the inflatable door is provided to seal the telescope optics from intense radiation of the sun or from contaminating gases which might be introduced into the area by a space shuttle vehicle visiting the orbiting telescope.

DESCRIPTION OF A PREFERRED EMBODIMENT

Figure 1:
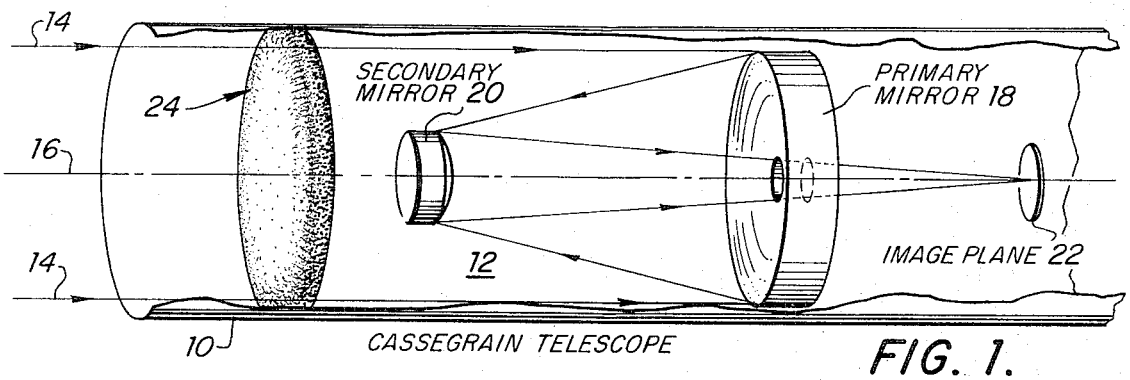
FIG. 1 illustrates a Cassegrain telescope which is provided with an inflatable door for sealing the entrance aperture of the telescope.

FIG. 1 illustrates a cylindrical housing 10 which is adapted to enclose an optical system 12 comprising a Cassegrain telescope. This is the type of telescope which is in the planning stages now and which will orbit the earth and gather information on the universe. Radiation 14 enters the telescope essentially parallel to the optical axis 16, is reflected from a primary mirror 18 a secondary mirror 20, and is reflected again to image the radiation at an image plane 22. A photosensitive sensor is located at the image plane 22 to record the image from outer space. By the nature of a Cassegrain telescope, the secondary mirror 20 provides a circular obstruction to radiation entering the telescope and reaching the primary mirror 18.

In one embodiment of the large space telescope, the primary mirror 18 and the secondary mirror 20 would have respectively approximately 10 and 3 foot diameters. These mirros wll have highly accurate optical surfaces, and will be designed to operate in the extreme environments of outer space. If a space shuttle visited the orbiting telescope regularly as is now planned, it would bring with it a cloud of waste gases including acidic and other corrosive gases which might enter the telescope and degrade the precision surfaces of the mirrors.

FIG. 1 illustrates the concept of this invention for sealing the entrance aperture of the telescope. Essentially the invention includes an inflatable door 24 which is inflated to seal the entrance to the telescope and is deflated during storage. When the door 24 is completely deflated, as illustrated in FIG. 3, the system is positioned completely within the circumference of the secondary mirror 18, and does not obscure the primary mirror 18 any more than it is already obscured by the secondary mirror 20.

Door 24 may be constructed from an appropriate, durable gas tight material such as Mylar. Alternatively, door 24 might be constructed of an elastic material to facilitate easy storage. In one embodiment of the large space telescope, the interior surface of housing 10 would have a plurality of extremely sharp edges which would be utilized to optically baffle extraneous light entering the telescope. With this embodiment, it might be necessary to provide special protection for the surface of the inflatable door which contacts the sharp baffling edges. In this embodiment, the contact areas of the door might be covered with an aluminum film to prevent a puncture of the door. Alternatively, the sharp baffling edges might be omitted from those areas of the housing 10 which contact the inflatable door.

Figure 2:
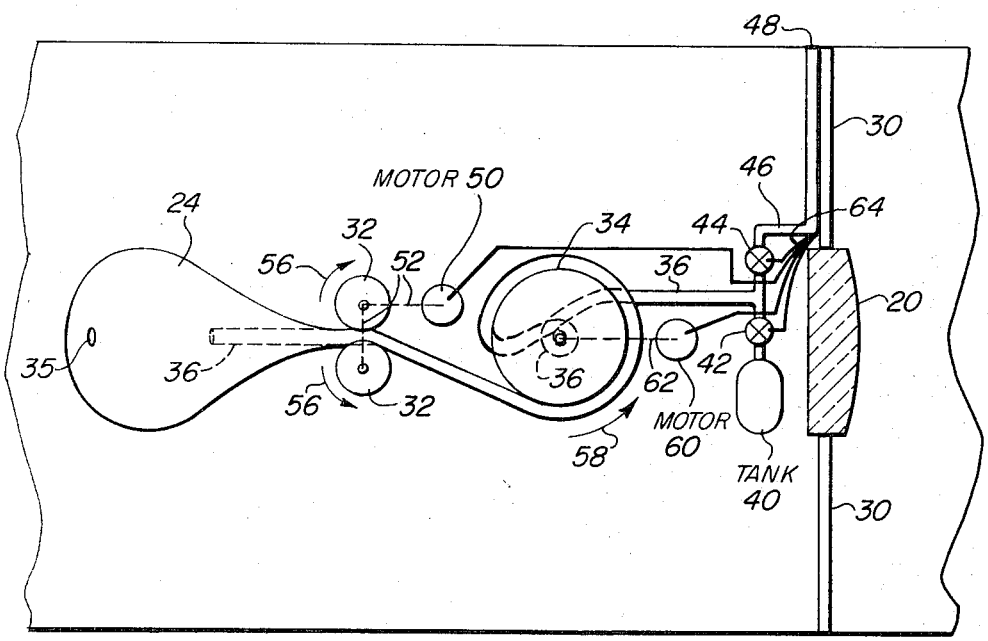
FIG. 2 illustrates in more detail one embodiment of a system for inflating, and deflating-storing the inflatable door.
Figure 3:
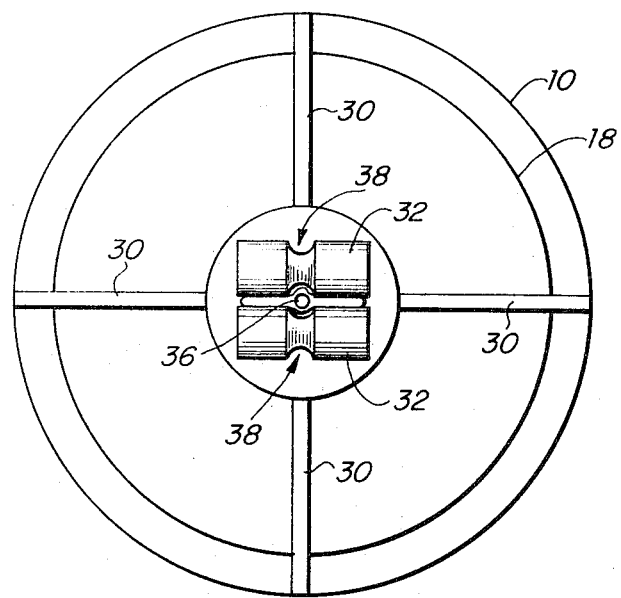
FIG. 3 shows the door in a deflated postion, and illustrates details of the guide rollers while omitting details on the rest of the system.

FIGS. 2 and 3 illustrate more details of one embodiment of a system for inflating, and deflating-storing a nonelastic inflatable door. Many of the components illustrated in FIGS. 2 and 3 which are utilized for storage might be omitted in embodiments of the invention wherein an elastic door is utilized, since an elastic door could be designed to occupy an area smaller than the area of the secondary mirror when it is deflated. The secondary mirror 20 is supported within the housing 10 by a number of spider support struts 30. An access tube 36 extends into the inflatable door 24 and is utilized to inflate and deflate the door. As shown in FIG. 2, access tube 36 is a flexible tube which may be wrapped around storage roller 34 during storage. The access tube proceeds from the interior of the inflatable door to a point of attachment on storage roller 34 whereat it proceeds through an aperture in storage roller 34 to the interior of the roller. It then proceeds out one end of the storage roller to valves 42 and 44. As illustrated in FIG. 2, some excess tubing may be provided in the interior of storage roller 34 so that the access tube may loop and unloop itself naturally as the storage roller is rotated The system also includes guide rollers 32, shown in FIGS. 2 and 3, and a storage roller 34 around which the inflatable door 24 is wrapped during storage. The guide rollers 32 include indents 38, shown in FIG. 3, which surround the sections of the inflatable door holding the access tube 36. The indents 38 ensure that the access tube 36 is not pinched closed during normal operation of the system. If required in particular embodiments, rollers or chutes may be positioned on the sides of rollers 32 to ensure that the deflated door does not protrude beyond the sides of either rollers 32 or roller 34.

The system further includes a gas supply tank 40 for inflating the door. The gas tank 40 is connected to the access tube 36 by an electrically actuated valve 42. The gas utilized to inflate the door may be an inert gas such as nitrogen. Because of the very low pressure in outer space, only a small amount of gas is required to inflate the door. The tank 40 is positioned so it can easily be replaced with a fresh tank. An electrically actuated valve 44, which connects to a vent tube 46, is utilized to deflate the door and vent the gas through an aperture 48 in the housing 10. In an alternative embodiment, access tube 36 may be utilized only to inflate the door. In this embodiment an electrically operated valve, shown schematically at 35, would be positioned on the exterior portion of the door for actuation to an open position when it is desired to deflate the door. This embodiment might be utilized when there is no danger that the vented gases might in some manner degrade the optics of the telescope.

A first motor 50 is mechanically coupled at 52 to the guide rollers 32. The motor 50 is utilized to drive the guide rollers in the directions indicated by arrows 56 during inflation of the door. A second motor 60 is mechanically coupled at 62 to drive storage roller 34 in a direction as shown by arrow 58 to wrap the door around the storage roller during deflation. Motors 50 and 60 may be constant torque motors. Valves 42 and 44 and motors 50 and 60 are selectively actuated by signals over wires 64 which run to the main control system for the telescope. When the space shuttle is on its way to the telescope, it would send a radio command to the radio receiver on the telescope to cause valve 42 to open and also to actuate motor 50. The actuation of motor 50 draws the inflatable door off storage roller 34, and feeds it out through guide rollers 32 while the door is being inflated through access tube 36. Valve 42 and motor 50 may be actuated for predetermined periods of time to allow their functions to be completed. During the inflation operation stoage roller 34 is free wheeling. After the space shuttle has left the telescope for a length of time sufficiently long for the contaminant gases to have dissipated from around the telescope, a second radio signal is sent to the telescope to open valve 44 to vent the gas from within door 24 through vent aperture 48. Also, motor 60 is actuated to start drawing the deflated door into its storage position around storage roller 34. Valve 44 and motor 60 may be actuated for predetermined periods of time to allow their functions to be completed. During the deflation-storage operation rollers 32 are free wheeling. In alternative embodiments, other types of drive systems may be utilized.

Although the preferred embodiment illustrates an orbiting, large space, Cassegrain telescope, the teachings of this invention are applicable to other types of telescopes such as Gregorian, Newtonian, or refractive telescopes, to small aperture telescopes, to ERTS vehicles, and to optical systems carried in the sortie mode on a space shuttle vehicle.

While several embodiments have been described, the teachings of this invention will suggest many other embodiments to those skilled in the art.

I claim:

1. A telescope adapted to orbit the earth and having a system to selectively protect the telescope from environmental damage and comprising:
   a. a telescope having a primary mirror for gathering radiation travelling along the optical axis of the telescope and reflecting it back to a secondary mirror which then further reflects the radiation to an image plane, said secondary mirror being positioned along said optical axis such that it presents an area of obstruction to radiation travelling along the optical axis which prevents radiation from reaching the primary mirror, whereby the effective aperture of said telescope is reduced because of said area of obstruction;
   b. a housing for supporting and enclosing said telescope, said housing having an aperture through which the telescope may be pointed at objects of interest;
   c. an inflatable door means supported by said housing within said aperture in said housing and also adjacent to said secondary mirror and within said area of obstruction of said secondary mirror such that said door means in its deflated condition does not further reduce the effective aperture of said telescope; and
   d. means for selectively inflating said door to prevent access to the telescope through said aperture in said housing, whereby environmental damage to the telescope may be prevented by shutting out corrosive gases and intense radiation from the sun.

2. Apparatus as set forth in claim 1 and wherein said secondary mirror and said inflatable door means are supported within said housing by a plurality of support struts extending from said housing to said secondary mirror and said inflatable door means.

3. Apparatus as set forth in claim 2 and wherein said inflatable door means includes a substantially non-elastic inflatable doors and means for folding said substantially non-elastic door for storage when the door is in a deflated condition.

* * * * *